(12) United States Patent
Davis

(10) Patent No.: US 6,439,188 B1
(45) Date of Patent: Aug. 27, 2002

(54) FOUR CYCLE FOUR CYLINDER IN-LINE ENGINE WITH ROTORS OF A SUPERCHARGING DEVICE USED AS BALANCE SHAFTS

(75) Inventor: Richard A. Davis, Mequon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/909,113

(22) Filed: Jul. 19, 2001

(51) Int. Cl.[7] ................................................. F02F 7/00
(52) U.S. Cl. ................................... 123/193.2; 60/605.1
(58) Field of Search ...................... 60/605.1; 123/192.2

(56) References Cited

U.S. PATENT DOCUMENTS

| | | | |
|---|---|---|---|
| 3,599,543 A | * | 8/1971 | Kerridge |
| 4,028,963 A | | 6/1977 | Nakamura et al. ............. 74/604 |
| 4,215,977 A | | 8/1980 | Weatherston ................... 418/1 |
| 4,509,474 A | * | 4/1985 | Schmuck ................. 123/192 B |
| 4,666,385 A | | 5/1987 | Okamoto et al. ............. 418/201 |
| 4,688,528 A | * | 8/1987 | Nivi et al. ............... 123/192 B |
| 4,696,267 A | * | 9/1987 | Kohno et al. ............ 123/192 B |
| 4,703,725 A | | 11/1987 | Weertman .................... 123/192 |
| 4,813,857 A | | 3/1989 | Kawakami ................... 418/104 |
| 4,819,505 A | | 4/1989 | Takuba et al. ................. 74/603 |
| 5,065,644 A | | 11/1991 | Shimada ...................... 74/603 |
| 5,253,547 A | | 10/1993 | Yoneyama et al. ............ 74/604 |
| 5,850,764 A | | 12/1998 | Bostelmann et al. .......... 74/603 |
| 5,904,604 A | * | 5/1999 | Suzuki et al. .................. 440/84 |
| 5,960,761 A | | 10/1999 | Kawakubo et al. .......... 123/192 |
| 6,189,499 B1 | | 2/2001 | Iwata et al. .................. 123/192 |
| 6,205,970 B1 | | 3/2001 | Iwata et al. .................. 123/192 |

OTHER PUBLICATIONS

"Advanced Engine Design Q&A" by Thrasher Engineered Performance (1999).
"Reciprocating Balancing" by Professor B.J. Stone (No date).

* cited by examiner

Primary Examiner—Hoang Nguyen
(74) Attorney, Agent, or Firm—William D. Lanyi

(57) ABSTRACT

A four cycle four cylinder in-line internal combustion engine is provided with a housing structure that contains two shafts which rotate in opposite directions to each other and at the same rotational velocity. Pairs of counterweights are attached to the two shafts in order to provide a counterbalance force which is generally equal to an opposite from the secondary shaking force which results from the reciprocal movement of the pistons of the engine. The first and second shafts are rotors of a supercharging device, such as a Roots blower. The rotational speed of the first and second shafts is twice that of the rotational speed of the crankshaft of the engine and the provision of counterweights on the first and second shafts balances the secondary forces caused by the reciprocal motion of the piston in the engine.

25 Claims, 5 Drawing Sheets

FOUR CYCLE FOUR CYLINDER IN-LINE ENGINE WITH ROTORS OF A SUPERCHARGING DEVICE USED AS BALANCE SHAFTS

BACKGROUND OF THE INVENTION

1. Field of the Invention

The present invention is generally related to an internal combustion engine with balance shafts and, more particularly, to a four cylinder four cycle in-line engine with a supercharging device in which two rotors of the supercharging device are provided with counterweights to balance the effect of secondary forces experienced by the engine.

2. Description of the Prior Art

Those skilled in the art of internal combustion engine design are familiar with many different types of balance shaft configurations used in internal combustion engines. Those skilled in the art of engine design are familiar with many different types of supercharging devices that utilize rotors. A Roots blower is one of several types of supercharging devices that employ two rotors.

U.S. Pat. No. 6,205,970, which issued to Iwata et al on Mar. 27, 2001, describes an engine balance shaft supporting structure. A casing accommodating therein a pair of balance shafts below the cylinder block comprises an upper casing and a lower casing that can vertically be split, and an oil pump body molded integrally with one of the upper and lower casings. In addition, one end of each of the two casings is inserted into the oil pump body for support therein and the two balance shafts are each supported on a bearing provided between the two casings in such a manner as to be split into two halves at the intermediate portion of the other end thereof.

U.S. Pat. No. 4,028,963, which issued to Nakamura et al on Jun. 14, 1977, describes an engine balancer. Balancer shafts are provided on the right and left of the crankshaft of an engine and so as to be driven thereby. Each balancer shaft has a balance weight divided into two portions, one on either side of a bearing supporting the balancer shaft. This construction protects the bearings from undesirable wear.

U.S. Pat. No. 6,189,499, which issued to Iwata et al on Feb. 20, 2001, describes a balancing device for a reciprocating engine. The balancing device for a reciprocating engine is provided which is improved so as not to disturb the compactification of an engine. There is provided a balancing device for a reciprocating engine comprising two balance shafts, gear connected to each other, a chain/sprocket mechanism for coupling at least one of the balance shafts with a crankshaft in an interlocking fashion, a chain tensioner for automatically adjusting the tension of the chain and a pump receiving portion integrally provided in a balance shaft holder for supporting the balance shafts for receiving a rotor of a lubricating oil pump, the balancing device being characterized in that the rotor of the lubricating oil pump is directly connected to the other balance shaft, and that the chain tensioner is disposed on a shaft end side of the other balance shaft.

U.S. Pat. No. 4,703,725, which issued to Weertman on Nov. 3, 1987, describes the mounting of an engine balancing device. An engine balance device utilizing rotating balance shafts is mounted in a housing means beneath the crankshaft and attached to the engine block by a plurality of legs spaced in the direction of the crankshaft axis to engage bearing journals located between cylinder bores. An oil pumping means evacuates oil from the housing means in cooperation with vacuum formation preventing air bleed means to the housing interior.

U.S. Pat. No. 4,819,505, which issued to Takubo et al on Apr. 11, 1989, describes balancer shafts for use in multicylinder engines. A balancer shaft for use in a multicylinder engine comprises a balance weight part formed to be eccentric in relation to a rotation axis of the balancer shaft and disposed along the alignment of cylinders in a cylinder block, an elongated shaft part extending from the balance weight part along the alignment of cylinders, a driving device provided on an end portion of the elongated shaft part for transmitting the rotation of a crankshaft in the cylinder block to the balancer shaft, a first journal provided on the end portion of the elongated shaft part, a second journal provided on a central portion of the balance weight part, and a third journal provided on an end portion of the balance weight part. The journals are supported by bearing portions provided in the cylinder block.

U.S. Pat. No. 5,253,547, which issued to Yoneyama et al on Oct. 19, 1993, describes a balancer device for an in-line engine. A balancer device is installed to an in-line engine comprising a balance shaft which includes first and second journals at which the balance shaft is supported through first and second bearings. The first bearing is disposed near the front part of the engine and set in a retainer for rotatably fixing the balance shaft. The second bearing is disposed near a generally center portion in the axial direction of the crankshaft and secured to a cylinder block. A pair of unbalanced portions are disposed near the second journal. The diameter of the first journal is formed smaller than that of the second journal to suppress the friction loss of the first journal.

U.S. Pat. No. 5,850,764, which issued to Bostelmann et al on Dec. 22, 1998, describes a crankshaft drive for an internal combustion engine. The crankshaft rotates at a predetermined direction and at a predetermined speed and a balance shaft extends parallel to the crankshaft and rotates at the predetermined speed of the crankshaft in a direction opposite to the predetermined rotating direction of the crankshaft. The crankshaft and the balance shaft carry balance weight means for balancing a mass of first order. An auxiliary shaft extends parallel to the crankshaft and rotates at the predetermined speed of the crankshaft in the predetermined rotating direction of the crankshaft. The auxiliary shaft carries a counterweight for balancing a residual moment resulting from the rotating balance shaft with respect to the rotating crankshaft.

U.S. Pat. No. 5,065,644, which issued to Shimada on Nov. 19, 1991, describes a counterbalance mechanism for an internal combustion engine. The engine has a crankshaft, a clutch, and a transmission including a main shaft rotatable by the crankshaft through the clutch and a countershaft rotatable by the main shaft through gears. A counterbalance mechanism includes at least a primary counterweight rotatable in synchronism with the crankshaft and a hollow shaft rotatably supported concentrically on the main shaft. The primary counterweight is integrally mounted on the hollow shaft. The clutch is corotatably mounted on the hollow shaft and operatively coupled to the crankshaft at the same speed as and in the opposite direction to the crankshaft.

U.S. Pat. No. 5,960,761, which issued to Kawakubo et al on Oct. 5, 1999, describes an engine with a balancer device for a vehicle. In order to suitably keep the weight balance of an engine while reducing a radial dimension of an engine, the crankshaft and a transmission shaft are supported in casings and are disposed to be substantially parallel to each other. A rear balancer and a front balancer are disposed with the crankshaft placed therebetween. An AC generator is disposed at an end portion of the crankshaft on the left side with respect to a plane passing through a center of gravity of an engine and being perpendicular to the crankshaft. A clutch is disposed at an end portion of the transmission shaft on the right side with respect to the plane. The clutch is separated from the plane at a distance smaller than that between the AC generator and the plane, so that the weight balance of the engine is suitably maintained by disposing the rear balancer and the front balancer on the clutch side.

U.S. Pat. No. 4,813,857, which issued to Kawakami on Mar. 21, 1989, describes a Roots blower. In a Roots blower having a casing, two rotors rotatably housed within the casing, and at least two grease-enclosing bearing units to rotatably support the rotors, the invention is characterized by a bypass groove which is formed for each of the bearing units so as to communicate between a first chamber defined by the casing and the rotors on the side of one axial end of the bearing unit and a second chamber formed by the casing in the bearing unit on the other axial end of the bearing unit, and in that a pair of pressure loaded seal rings is disposed on axially opposite sides of the bearing unit in such a way that one periphery of each seal ring is secured to a stationary portion of the bearing unit and the other periphery thereof is free to move selectively into or out of contact with a movable portion of the bearing unit according to the presence or absence of a pressure difference produced by a delay in a pressure-balancing action of the bypass groove between the two chambers so that the seal ring prevents bearing grease from leaking.

U.S. Pat. No. 4,215,977, which issued to Weatherston on Aug. 5, 1980, describes a pulse-free blower. A three lobe Root's blower is provided with feed back structure to bring the gas trapped in the impeller well volumes up to the discharge pressure prior to delivery. An essentially uniform and pulse-free discharge is produced by having a constant feed back flow rate which is achieved by always having a trapped impeller well volume in communication with the outlet via feed back structure which is sized to yield a continuous fee back flow rate.

U.S. Pat. No. 4,666,385, which issued to Okamoto et al on May 19, 1987, describes a Roots type blower. The blower is disclosed having rotors with a twisted shape and projections on the pitch side. The blower is compact in the axial direction, because the projections work as gearing between the rotors. Therefore, it is not necessary to provide additional gears for driving the rotors.

U.S. Pat. No. 4,781,541, which issued to Sohler et al on Nov. 1, 1988, describes an external axial rotary piston blower with noise suppressing transfer ports. An external axial rotary piston blower for quarter-roller type of construction with transfer ports leading to the outlet in the casing runway surfacing or inner peripheral surface of the housing with length differing relative to each other and increasing cross section differing toward the outlet, the greatest length of which can be permitted to be dimensioned or measured only such that the transfer ports are first opened when the inlet is closed off by the piston traversing the same.

The patents described above are hereby expressly incorporated by reference in the description of the preferred embodiment.

Engine balance shafts are provided in certain types of engines in order to counterbalance the forces generated by the movement of the pistons and connecting rods within the engine in coordination with the rotation of a crankshaft supported by bearings disposed within the engine structure. Certain types of internal combustion engines, such as four cylinder in-line engines, can be essentially balanced without the use of additional counterbalance shafts to the extent that all primary vertical and horizontal inertia forces and moments are cancelled out as well as secondary moments. However, certain secondary forces perpendicular to the crankshaft axis are not inherently balanced and therefore remain unresolved during the operation of the engine. These unresolved forces create undesirable effects with regard to the noise, vibration, and harshness of the engine's operation. These forces require some type of compensation, particularly in engines having displacements greater than 2.0 liters. Primary forces are inertia forces created by the acceleration of the piston assembly mass caused by the rotating crank pin's projected motion along a line of stroke due to the reciprocating motion of the piston assembly. Secondary forces are those inertia forces caused by the projected motion perpendicular to the line of stroke caused by the rotating motion of the connecting rod. In other words, the secondary force is due to the addition or subtraction in piston acceleration produced by the rotating crank pin increasing or decreasing the inclination of the connecting rod to the line of stroke. During the initial 90 degrees of crankshaft rotation, this secondary movement of the connecting rod is away from the line of stroke, thus adding to the piston movement while during the second 90 degrees of crankshaft rotation, this secondary movement of the connecting rod is toward the line of stroke. This subtracts from the distance the piston moves. Furthermore, secondary forces increase and decrease their magnitude at twice the frequency of the primary force. A detailed description of the cyclic forces relating to internal combustion engines is available in "Advanced Engine Design Q&A" by Thrasher Engineered Performance. Another explanation of engine cyclic engine forces is provided in "Reciprocating Balancing" by Professor B. J. Stone. Both of these articles were obtained from associated internet sites.

Four cylinder four cycle in-line engines have this unbalanced secondary force which becomes objectionable when the displacement of the engine exceeds approximately 2.3 liters. Common practice in the prior art is to install twin counterrotating balance shafts which rotate in opposite directions at twice the crankshaft speed. These counterrotating balance shafts are positioned to cancel the secondary forces. It would therefore be significantly advantageous if a device could be provided which counterbalances the secondary force of the four cylinder four cycle in-line engine without requiring additional balance shafts to be provided which serve no other purpose except to perform this balance function.

SUMMARY OF THE INVENTION

An engine, made in accordance with the present invention, comprises a crankshaft supported for rotation about a vertical axis and a plurality of pistons connected to the crankshaft in which each of the plurality of pistons is disposed for reciprocating movement within an associated one of a plurality of cylinders of the engine. In addition, first and second shafts are provided. Each shaft is supported for rotation about an individual axis of rotation at a rotational velocity and in a rotational direction. Each of the first and second shafts has a center of gravity which is radially displaced from the axis of rotation by a preselected amount. The first and second axes of rotation are generally parallel to the vertical axis about which the crankshaft rotates. The first and second rotational directions are opposite to each other and the first and second rotational velocities are each generally equal to a preselected multiple, such as two, of the rotational velocity of the crankshaft.

In a preferred embodiment of the present invention, it further comprises a housing in which the first and second shafts are supported by the housing for rotation within the housing. The housing is rigidly attached to the engine.

In a particularly preferred embodiment of the present invention, the first and second shafts are first and second rotors of a supercharging device. The supercharging device is preferably a Roots blower. In a preferred arrangement, a first plane, bisecting each of the plurality of pistons and containing the vertical axis of the crankshaft, extends between and is equidistant from the first and second axes of rotation of the first and second shafts.

The primary advantage of the present invention is that it allows an engine to be completely balanced through the use of the rotors of the supercharger which is used for the independent purpose of providing additional air to the engine. In other words, through the use of the present invention, a supercharged engine can be satisfactorily balanced without requiring additional balance shafts beyond those two rotors used in the supercharger.

In a particularly preferred embodiment of the present invention, the engine is a powerhead of an outboard motor. The engine can further comprise first and second pairs of counterweights attached to the first and second shafts to cause the first and second centers of gravity to be radially displaced from the first and second axes of rotation by the first and second preselected amounts. The first and second pairs of counterweights can be formed as integral parts of the first and second shafts or, alternatively, can be individual components that are attached to the first and second shafts. Although a preferred embodiment of the present invention incorporates a pair of counterweights on each of the first and second shafts in order to balance the secondary forces without inducing additional unbalanced moments, it should be understood that this arrangement is not required on all embodiments. The shafts themselves can be shaped to result in the desired imbalance.

The preselected multiple which describes the relationship between the rotational speeds of the crankshaft and of the first and second shafts is equal to two in a preferred embodiment of the present invention. In other words, the first and second shafts counter rotate at twice the speed of the crankshaft.

The plurality of pistons in a preferred embodiment of the present invention comprises four pistons connected to the crankshaft and dispose in four cylinders. The four cylinders are disposed in an in-line configuration and the engine is a four cycle engine in a preferred embodiment. In a preferred embodiment of the present invention, the crank pins of the crankshaft are all arranged in a common plane. This arrangement is referred to as a planar crankshaft and is illustrated in FIG. 3.

The first and second shafts are connected in torque transmitting association with the planar crankshaft. The first shaft can be connected directly in torque transmitting association with the planar crankshaft and the second shaft can be connected in torque transmitting association with the first shaft. In other words, within the housing, the first and second shafts can be geared together and either one of the two shafts can be driven by the crankshaft by a timed arrangement to the crankshaft positions, either by a chain connection, a flexible cogged belt connection, or through a pair of gears.

BRIEF DESCRIPTION OF THE DRAWINGS

The present invention will be more fully and clearly understood from a reading of the description of the preferred embodiment of the present invention in conjunction with the drawings, in which.

DESCRIPTION OF THE PREFERRED EMBODIMENT

Figure 1:
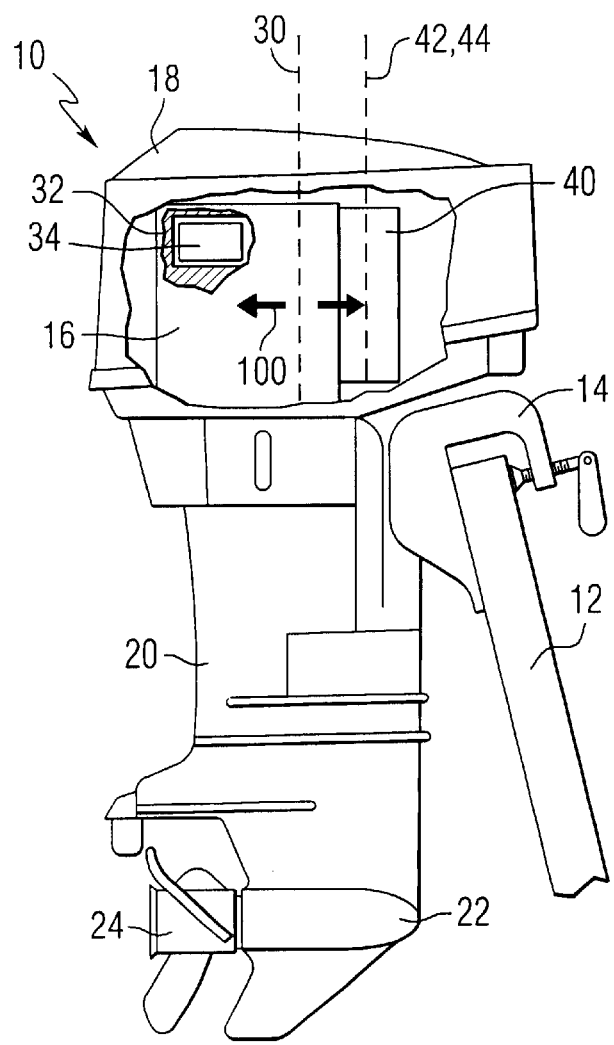
FIG. 1 shows an outboard motor with the present invention.

Throughout the description of the preferred embodiment of the present invention, like components will be identified by like reference numerals.

FIG. 1 shows an outboard motor 10 attached to a transom 12 of a boat with a transom bracket 14. A highly schematic representation of an internal combustion engine 16 is shown under the cowl 18. Also shown in FIG. 1 is a driveshaft housing 20 and a gear housing 22. As is well known to those skilled in the art, a vertically disposed driveshaft is supported within the driveshaft housing 20 and connected in torque transmitting relation, through a gearing arrangement within the gear housing 22, to a horizontally disposed propeller shaft to which a propeller 24 is attached for rotation. The driveshaft, within the driveshaft housing 20, is attached in torque transmitting relation with a crankshaft of the engine 16. The crankshaft, which rotates about a vertical axis 30, is not illustrated in FIG. 1. For purposes of illustrating the relative positions of certain components of the engine 16, a single cylinder 32 is shown with a single piston 34 disposed in it for reciprocal movement within the cylinder 32. Although only a single cylinder and piston are illustrated in a highly schematic manner in FIG. 1, it should be understood that the present invention is intended for use in association with an engine having a plurality of pistons and cylinders. In the illustration of FIG. 1, a housing 40 is rigidly attached to the engine 16 for supporting first and second shafts within the housing. The first and second shafts, as will be described in greater detail below, are rotatable about first and second axes of rotation, 42 and 44, which are aligned with each other in a plane perpendicular to the drawing of FIG. 1.

Figure 2:
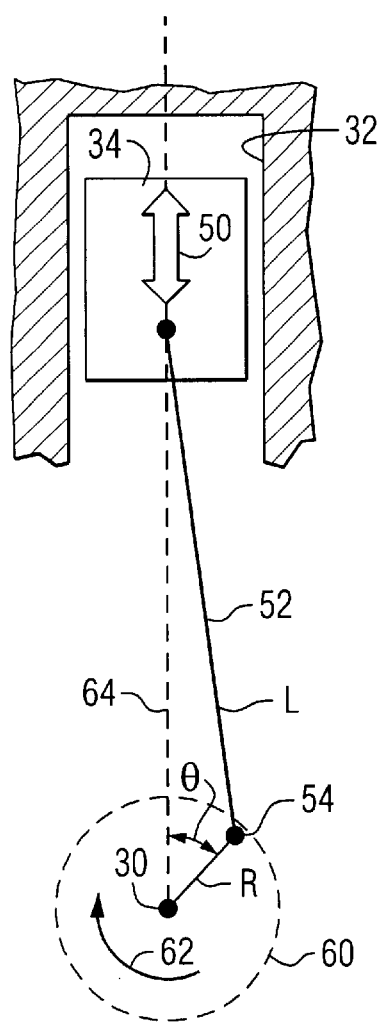
FIG. 2 is a schematic representation of the relevant geometry of a single piston and crankshaft.

FIG. 2 is a schematic representation of a cylinder 32 of an internal combustion engine with a piston 34 disposed within the cylinder 32 for reciprocating motion as represented by arrow 50. The piston 34 is attached to a connecting rod 52 which, in turn, is connected at point 54 to a crankshaft which rotates about its axis 30. The dashed circle 60 in FIG. 2 represents the area in which the crankshaft is confined for rotation about its axis 30 in the direction represented by arrow 62. The connecting rod 52 has a length L and is connected to the crankshaft at point 52 which is a distance R from the axis 30. As the crankshaft rotates about its axis 30, the relationship between the connecting rod L, radius R, and the connection to the piston 34 determine the specific relationship between the rotation of the crankshaft and the reciprocal movement of the piston 34.

With reference to FIGS. 1 and 2, it should be understood that although the piston's movement is illustrated in FIG. 2 as being vertical, the illustration of FIG. 1 more accurately shows the relationship between the vertical axis 30, about which the crankshaft rotates, and the position of the piston 34 within its associated cylinder 32.

With continued reference to FIG. 2, it can be seen that as the piston 34 moves away from its top dead center position in a direction toward the axis 30 of the crankshaft, point 54 moves both downward in FIG. 2 and away from dashed line 64 which is used to illustrate the direction in which the piston 34 moves. This movement of point 54, both in a downward direction and in a direction away from dashed line 64, accelerates the piston 34 away from its top dead center position. This is true between the range of values of θ between 0 degrees and 90 degrees. However, between magnitudes of θ of 90 degrees and 180 degrees, point 54 moves downward, but toward dashed line 64. As a result, although point 52 is moving downward in FIG. 2 within this range, its movement toward dashed line 64 does not serve to add to the acceleration effect of the rotation of the crankshaft. As a result, the piston 34 experiences a greater acceleration, in an absolute sense, when it is near its top dead center position (i.e. θ=0 degrees) than it experiences when it is near its bottom dead center position (i.e. θ=180 degrees). This difference in accelerations is important to the dynamics of an engine, as will be described in greater detail below, because the acceleration acts on the mass of the piston assembly to create forces which are asymmetrical as the piston 34 moves through its entire reciprocal path from top dead center (TDC) to bottom dead center (BDC) and back to top dead center. These secondary forces are in a direction from left to right in FIG. 1. In other words, the forces oscillate from a forward direction, in the direction of travel of the boat, to a rearward direction which is opposite the direction of travel of the boat. These forces, sometimes referred to as "shaking forces" can become significant in engines with larger displacements, such as above 2.0 liters. In an automobile engine, these secondary forces result in vertical shaking of the engine. In a marine engine used in association with an outboard motor, such as that which is illustrated in FIG. 1, these forces result in horizontal shaking forces in directions from forward to rearward.

Figure 3:
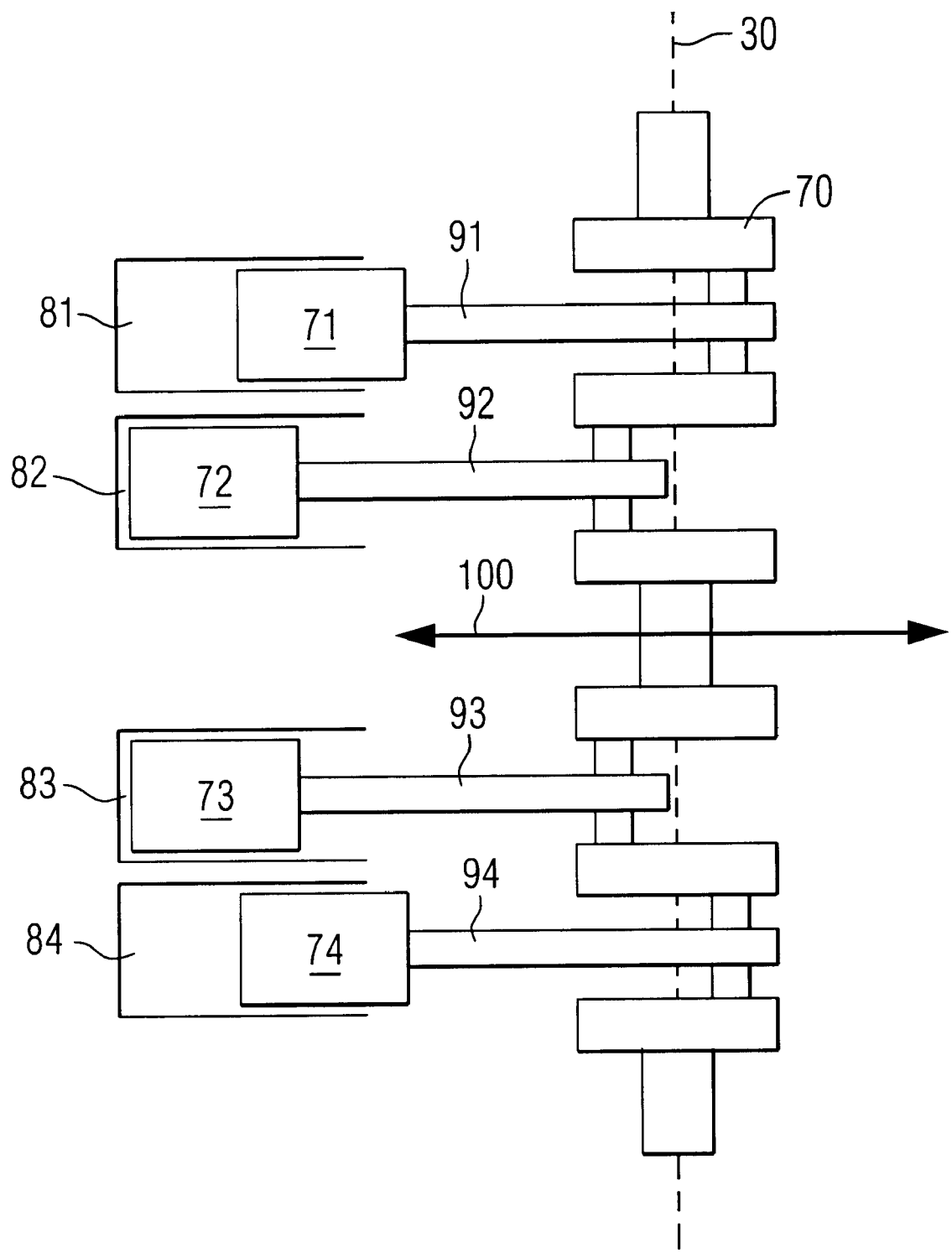
FIG. 3 is a schematic representation of four pistons attached to a crankshaft and disposed for reciprocal motion within four associated cylinders.

FIG. 3 is a highly schematic representation of a planar crankshaft 70 supported for rotation about a vertical axis 30 and connected to pistons 71–74 which rotate within associated cylinders 81–84. The planar crankshaft 70 is supported within the engine and connected to the cylinders by connecting rods 91–94. In an in-line four cylinder engine, the four cylinders 81–84 are disposed in an in-line configuration. In this type of arrangement, pairs of pistons move in a coordinated manner. In other words, pistons 71 and 74 reach their top dead center and bottom dead center positions simultaneously and the positions, velocities, and accelerations of the pair of pistons, 71 and 74, are identical to each other throughout the complete rotation of the planar crankshaft 70. Similarly, pistons 72 and 73 move in coordinated manner with identical positions, velocities, and accelerations throughout their range of travel. In addition, when pistons 71 and 74 are at their bottom dead center positions, as illustrated in FIG. 3, pistons 72 and 73 are at their top dead center positions. As a result of this type of configuration, the primary forces and moments are inherently balanced. However, since the pair of pistons moving near their top dead center positions experience greater accelerations than the other two pistons which are simultaneously moving near their bottom dead center positions, unbalanced forces are created. These unbalanced accelerations result in a shaking force represented by arrow 100 in FIG. 3.

Figure 4:
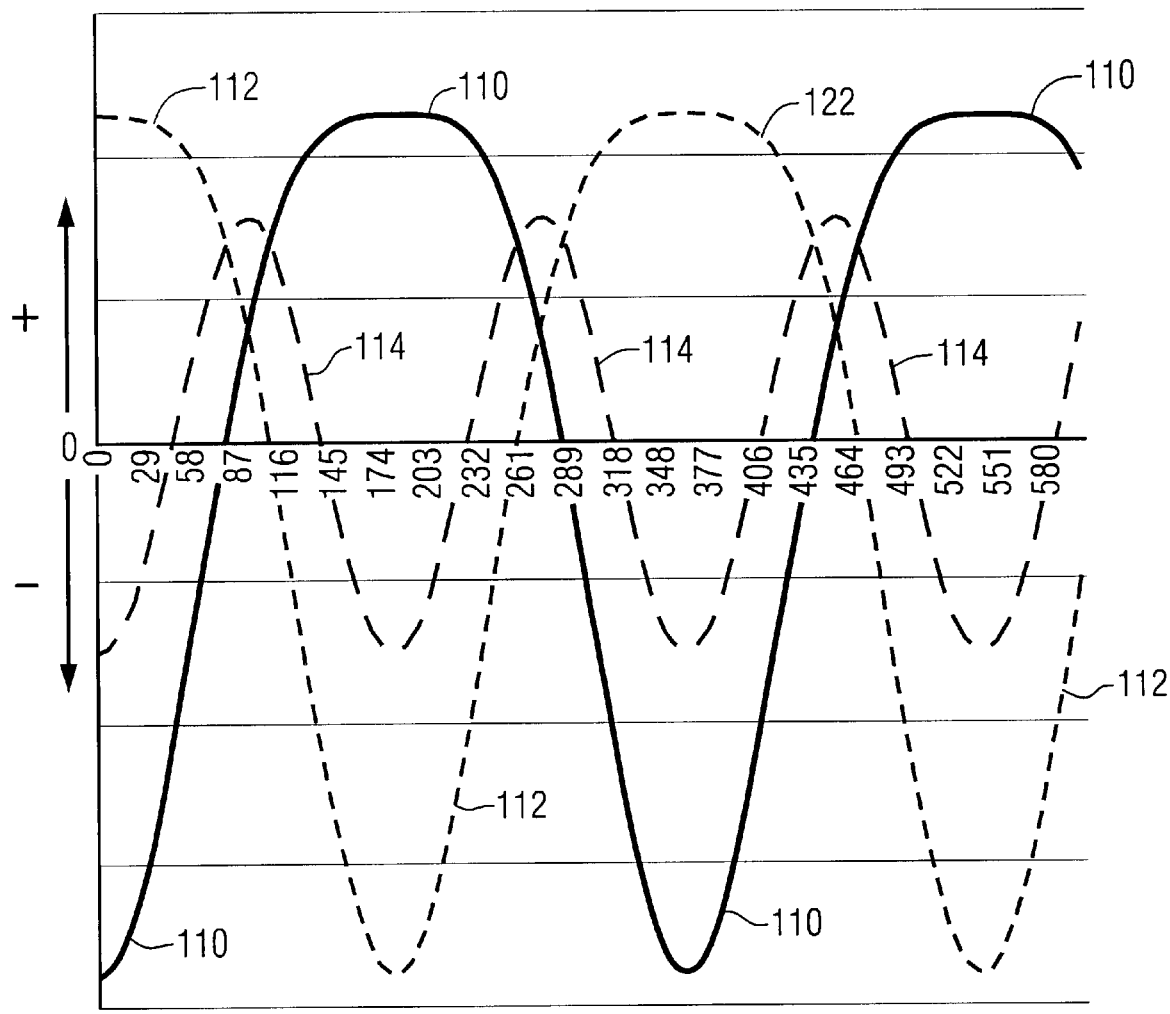
FIG. 4 is a graphical representation of various accelerations and forces of an internal combustion engine.

With reference to FIGS. 2, 3, and 4, the graphical representation of FIG. 4 shows the accelerations, and therefore the forces, experienced by the pistons 71–74 as the planar crankshaft 70 rotates about its vertical axis 30. The horizontal axis in FIG. 4 represents the magnitude of angle θ which is illustrated in FIG. 2. Line 110 in FIG. 4 shows the acceleration, as a function of angle θ, of pistons 71 and 74 illustrated in FIG. 3. It should be noted that piston 71 and 74 move in synchronism with each other. Also, since the force on an object is equal to its mass multiplied by its acceleration, line 110 in FIG. 4 also represents the relative force exerted on the planar crankshaft 70 by the piston assemblies, as a function of angle θ. In FIG. 4, dashed line 112 represents the relative acceleration, and therefore force, on the crankshaft 70, related to the other pair of pistons, 72 and 73. It should be noted that dashed line 112 is identical to dashed line 110, but displaced by 180 degrees.

With continued reference to FIG. 4, it can be seen that the acceleration represented by line 110 is greatest at 0 degrees and 360 degrees, which represents the acceleration of pistons 71 and 74 as they reach their top dead center (TDC) positions. Similarly, dashed line 112 indicates that the maximum acceleration experienced by pistons 72 and 73 occurs when those pistons are at their top dead center (TDC) positions. As described above, a four cylinder four cycle in-line arrangement intentionally causes the pistons to reciprocate, in pairs, with a 180 degree displacement, or offset, between pairs as a function of crankshaft rotation.

The total acceleration of the pistons of the engine, and therefore the force exerted on the engine by the piston assemblies, can be obtained by adding lines 110 and 112 together. The sum of these two relative acceleration/force curves is represented by dashed line 114 in FIG. 4. This summation of forces therefore causes a cyclic force that alternately is exerted, at a frequency which is twice that of the crankshaft speed, in a forward and then a rearward direction on the crankshaft 70 and therefore on the engine 16. This cyclic force is represented by arrow 100 in FIG. 3. It is also illustrated by arrow 100 in FIG. 1. In FIG. 1, it can be seen that the oscillating force represented by line 114 in FIG. 4 causes forward and rearward shaking forces on the outboard motor 10 and, as a result, on the transom 12 and the boat to which the outboard is attached. These forward and rearward shaking forces are secondary forces caused by the unequal accelerations experienced by the pistons 71–74 as they reciprocate through a complete cycle motion.

Figure 5:
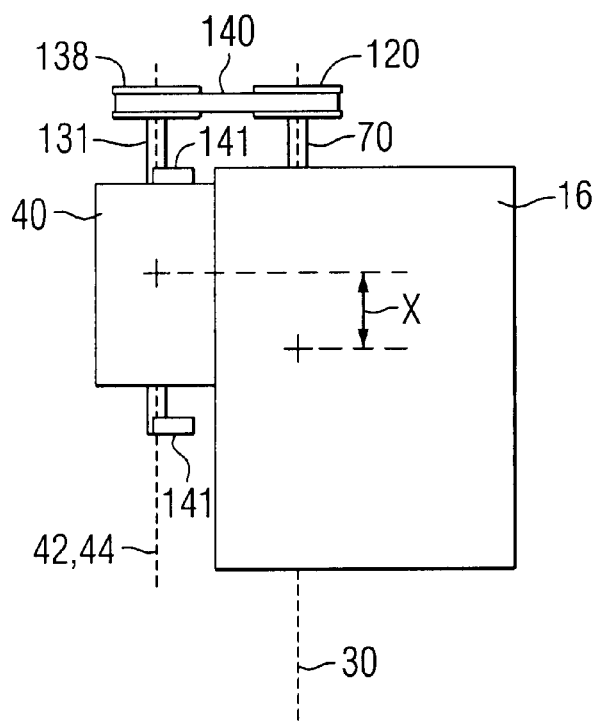
FIG. 5 is a highly schematic representation of an engine and a supercharger rigidly attached to the engine.

FIG. 5 is a schematic representation showing the physical relationship between the engine 16 and the housing 40 which contains and supports the first and second shafts which rotate about respective first and second axes of rotation, 42 and 44. In FIG. 5, the two axes of rotation are aligned in a plane perpendicular to the illustration. An extension of crankshaft 70, which rotates about the vertical axis 30, is illustrated with a pulley 120 attached to it above the engine 16. The housing 40, which is a Roots blower in a preferred embodiment of the present invention, has the first and second shafts contained within its housing 40. One of the shafts (i.e. the first shaft) is identified by reference numeral 131 in FIG. 5. It has a pulley 138 attached to it. This enables pulleys 120 and 138 to be synchronously connected to each other by a cogged belt or chain identified by reference numeral 140. In this way, the planar crankshaft 70 provides a motive force which causes the shafts within the housing 40 to rotate in synchrony with each other. Reference numeral 141 identifies a pair of counterweights which are attached to shaft 131 which provides a center of gravity of shaft 131 which is radially displaced from the first axis of rotation 42 associated with shaft 131. The counterweights 141 are arranged at each end of the first shaft 131 for the purpose of balancing the force resulting from the offset of the shaft's center of gravity caused by the attachment of the counterweights to the shaft.

In FIG. 5, dimension "X" represents the vertical distance between the effective center of the first and second shafts within the housing 40 and that of the engine's crankshaft 70. The magnitude of this dimension should be minimized as much as possible.

Figure 6:
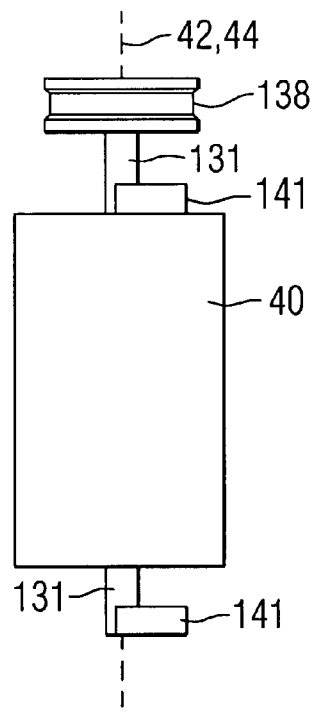
FIG. 6 is a simplified schematic representation of the supercharger shown in FIG. 5.
Figure 7:
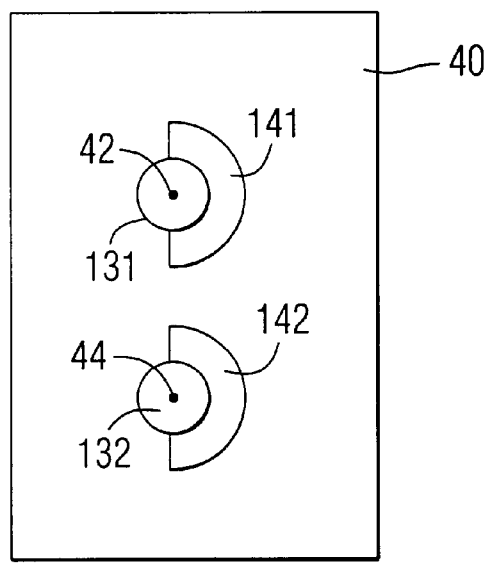
FIG. 7 is a bottom view of FIG. 6.

FIG. 6 is a schematic representation of the housing 40 with the first shaft 131 being attached to a pulley 138 for the purposes described above. It also shows a pair of counterweights 141 attached to the first shaft 131. FIG. 7 is a bottom view of FIG. 6 showing the first shaft 131 and the second shaft 132 each having pair of counterweights, 141 and 142, respectively, attached to them. The first and second shafts rotate about axes of rotation, 42 and 44, respectively. The first and second axes, 42 and 44 are generally parallel to the vertical axis 30 of the planar crankshaft 70 described above. The first and second rotational directions of the first and second shafts are opposite to each other and the first and second rotational velocities are equal to a preselected multiple of the rotational velocity of the crankshaft 70 about its vertical axis 30. In other words, the first and second shafts, 131 and 132, are geared together to rotate in opposite directions and at the same rotational velocity. They are also connected in torque transmitting relation with the crankshaft 70 in a way which causes the first and second shafts to rotate at a preselected speed which is a preselected multiple of the crankshaft rotational velocity. This is accomplished by appropriate pulley selection or gear selection in the manner in which the crankshaft 70 is connected in torque transmitting relation with the first and second shafts, 131 and 132, in the housing 40.

Although other configurations are possible, a preferred embodiment of the present invention incorporates a Roots blower, or Roots supercharger, which provides the housing 40 and the two shafts, 131 and 132. Roots blowers, as described in the description of the prior art above, inherently comprise two rotors which rotate in opposite rotational directions and at the same rotational velocity. In a typical application, however, supercharging devices are intended to have rotors which are maintained in balance so that each rotor has a center of gravity coincident with the axis of rotation of that rotor. Any deviation from this configuration causes an imbalance of the rotor and would typically result in an undesirable vibration of that rotor and the supporting housing. In the present invention, the rotors of the Roots blower are intentionally unbalanced, by the addition of pairs of counterweights, 141 and 142, to create an imbalance which, as a result, creates an oscillating force in a preselected direction.

FIGS. 8A–8D illustrate various positions of the first and second shafts, 131 and 132, and their associated pair of counterweights, 141 and 142. FIGS. 8A–8D are bottom views of the illustration in FIG. 5.

Figure 8D:
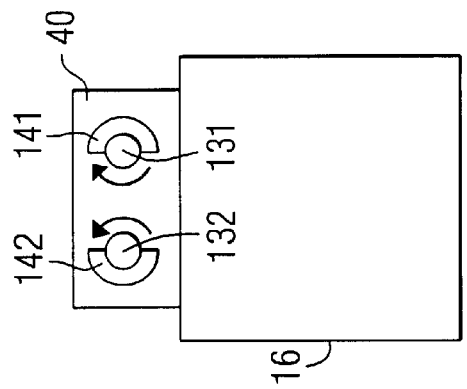
FIGS. 8A–8D show the present invention associated with an engine and illustrated at four rotational positions.
Figure 8C:
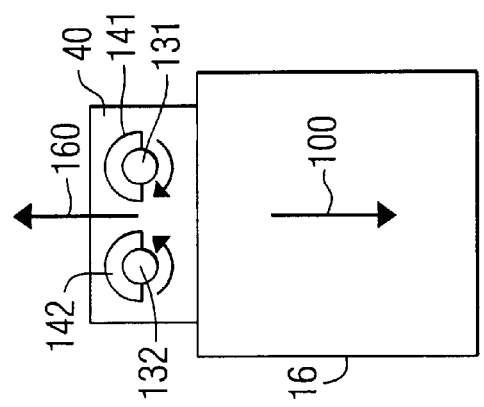
Figure 8B:
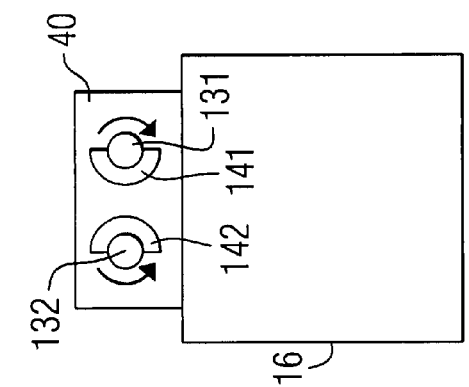
Figure 8A:
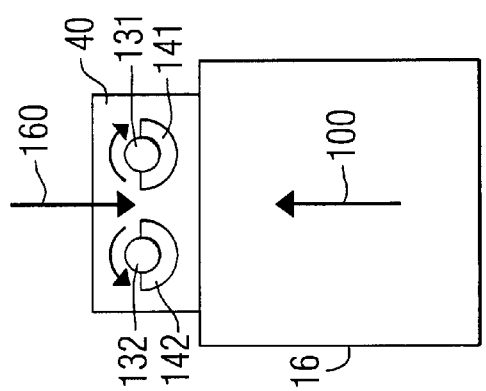

In FIG. 8A, shaft 131 rotates clockwise and shaft 132 rotates counterclockwise, as represented by the rotational arrows. When the counterweights, 141 and 142, are in the position shown in FIG. 8A, a resultant downward force 160 is exerted on the housing 40 and, as a result, on the engine 16 to which the housing is rigidly attached. Since FIGS. 8A–8D are bottom views of the illustration shown in FIG. 5, it should be understood that the downward force 160 is actually a rearward force exerted on the engine 16 as represented in FIG. 1. The occurrence of this downward force 160 is timed to be coincident with an equal and opposite upward force 100 caused by the physical effect described above in conjunction with FIGS. 3 and 4. With reference to FIG. 4, it can be seen that dashed line 114 illustrates an oscillating force 100, as shown in FIG. 3, which has a frequency which is twice the frequency of the rotating planar crankshaft 70. This is clearly illustrated in FIG. 4 where the frequency of dashed line 114 is twice the frequency of either line 110 or dashed line 112.

FIG. 8B represents a condition when the pairs of counterweights, 141 and 142, have further rotated into positions facing each other. This creates no force in the direction of arrow 160 of FIG. 8A. All other forces are balanced when the counterweights are in the position shown in FIG. 8B and the oscillating force represented by dashed line 114 is nonexistent or insignificant in magnitude.

FIG. 8C shows the condition where the two counterweights, 141 and 142, have further rotated into positions facing away from the engine 16. This creates a resulting force 160 on the housing 40 and on the engine 16. Force 160, which is opposite to force 160 described in conjunction with FIG. 8A balances the force 100 resulting from the physical characteristics described above in conjunction with FIGS. 3 and 4.

FIG. 8D illustrates the later condition where the two pairs of counterweights, 141 and 142, have rotated to positions facing away from each other. At this time, all forces are in balance and essentially no net force is experienced by the housing 40 or the engine 16.

With reference to FIGS. 4 and 8A–8D, the conditions shown in FIGS. 8A and 8C coincide with positive and negative peaks of line 114 in FIG. 4. As a result, the first shaft 131 and the second shaft 132 rotate at a rotational velocity which is twice the velocity of the planar crankshaft 70. This results in a balancing of the shaking force 100 with the force 160 exerted as a result of the imbalance of the Roots blower caused by counterweights 141 and 142.

The present invention takes synergistic advantage of the presence of a supercharger on certain engines. If the supercharger is a Roots blower or any other type of supercharger which comprises two counterrotating rotors which rotate at identical rotational velocities, pairs of counterweights can be added to those rotors to intentionally unbalance them for the purpose of causing balancing forces 160 to offset the effects of forces 100 which are inherent in certain types of engines.

With reference to FIGS. 1–7 and 8A–8D, it can be seen that a preferred embodiment of the present invention is an engine 16 which comprises a planar crankshaft 70 supported for rotation about a vertical axis 30. A plurality of pistons, 71–74, are connected to the crankshaft 70 and each of the pistons is disposed for reciprocating movement within an associated one of a plurality of cylinders, 81–84, of the engine 16. A first shaft 131 is supported for rotation about a first axis of rotation 42 at a first rotational velocity in a first rotational direction. The first shaft 131 has a first center of gravity which is radially displaced, as a result of the pair of counterweights 141, from the first axis of rotation 42 by a first preselected amount. A second shaft 132 is supported for rotation about a second axis of rotation 44 at a second rotational velocity at a second rotational direction. In a preferred embodiment, the first and second shafts rotate at identical rotational velocities and in opposite rotational directions. The second shaft 132 has a second center of gravity, resulting from the position of counterweight 142 which is radially displaced from the second axis of rotation 44 by a second preselected amount. The first and second axes of rotation, 42 and 44, are generally vertical and parallel to the vertical axis 30 of the crankshaft 70. The first and second rotational directions are opposite to each other and the first and second rotational velocities are generally equal to a preselected multiple of the rotational velocity of the crankshaft. The preselected multiple is equal to two in a preferred embodiment of the present invention. A housing 40 is provided to support the first and second shaft, 131 and 132, for rotation within the housing. The housing 40 is rigidly attached to the engine 16. As described above, in a preferred embodiment of the present invention, the first and second shafts, 131 and 132, are first and second rotors, respectively, of a Roots blower or other type of supercharging device in which the two rotors rotate in opposite directions and at identical or similar speeds.

In a preferred embodiment of the present invention, a first plane bisects each of the plurality of pistons, 71–74, and also contains the vertical axis 30 within the first plane. That first plane extends between the first and second axes of rotation, 42 and 44, and is essentially equidistant to both axes, 42 and 44. That first plane would be parallel to the plane of FIGS. 3 and 5 and would appear as a straight vertical line in FIGS. 8A–8D.

In a preferred embodiment of the present invention, the engine 16 is a powerhead of an outboard motor 10 and the first and second pairs of counterweights are removably attached to their associated shafts in order to radially displace their respective centers of gravity. The counterweights can also be formed integrally with the first and second shafts. In providing a motive force to cause the first and second shafts to rotate, the planar crankshaft 70 can be synchronously attached to one or both of the first and second shafts, by an appropriate gear, cogged belt, or chain, and internal gearing can be provided between the first and second shafts to transfer torque between them and assure that they rotate in a proper relationship and in synchrony with each other. The preselected multiple between the velocities of the first and second shafts and the velocities of the crankshaft 70 is equal to two in a preferred embodiment of the present invention. Furthermore, the plurality of pistons comprises four pistons and the plurality of cylinders comprises four cylinders in a preferred embodiment. The four cylinders are disposed in an in-line configuration with a planar crankshaft and the engine is a four cycle engine.

Although the present invention is particularly intended for use in association with a four cycle four cylinder in-line internal combustion engine used in an outboard motor, it should be understood that the basic principles of the present invention can also be applied in other situations.

I claim:

1. An engine, comprising:
a crankshaft supported for rotation about a crankshaft axis;
a plurality of pistons connected to said crankshaft, each of said plurality of pistons being disposed for reciprocating movement within an associated one of a plurality of cylinders of said engine;
a first shaft supported for rotation about a first axis of rotation at a first rotational velocity in a first rotational direction, said first shaft having a first center of gravity which is radially displaced from said first axis of rotation by a first preselected amount;
a second shaft supported for rotation about a second axis of rotation at a second rotational velocity in a second rotational direction, said second shaft having a second center of gravity which is radially displaced from said second axis of rotation by a second preselected amount, said first and second axes of rotation being generally parallel to said crankshaft axis, said first and second rotational directions being opposite to each other, said first and second rotational velocities each being generally equal to a preselected multiple of the rotational velocity of said crankshaft; and
a housing structure attached to said engine, said first and second shafts being supported by said housing structure for rotation within said housing structure, said housing structure being removably attached to said engine, said housing structure containing a supercharging device.

2. The engine of claim 1, wherein:
said first and second shafts are first and second rotors, respectively, of said supercharging device.

3. The engine of claim 2, wherein:
said supercharging device is a Roots blower.

4. The engine of claim 1, wherein:
a first plane, bisecting each of said plurality of pistons and containing said vertical axis, extends between and is equidistant from said first and second axes of rotation.

5. The engine of claim 4, wherein:
said engine is a powerhead of an outboard motor.

6. The engine of claim 1, further comprising:
a first counterweight attached to said first shaft to cause said first center of gravity to be radially displaced from said first axis of rotation by said first preselected amount; and
a second counterweight attached to said second shaft to cause said second center of gravity to be radially displaced from said second axis of rotation by said second preselected amount.

7. The engine of claim 6, wherein:
said first counterweight is formed as an integral part of said first shaft and said second counterweight is formed as an integral part of said second shaft.

8. The engine of claim 1, wherein:
said preselected multiple is two.

9. The engine of claim 1, wherein:
said plurality of pistons comprises four pistons connected to said crankshaft and said plurality of cylinders comprises four cylinders.

10. The engine of claim 9, wherein:
said four cylinders are disposed in an in-line configuration.

11. The engine of claim 1, wherein:
said engine is a four cycle engine.

12. The engine of claim 1, wherein:
said engine is a marine engine.

13. The engine of claim 1, wherein:
said first and second shafts are connected in torque transmitting association with said crankshaft.

14. The engine of claim 1, wherein:
said first shaft is connected in torque transmitting association with said crankshaft and said second shaft is connected in torque transmitting association with said first shaft.

15. An engine of an outboard motor, comprising:

a crankshaft supported for rotation about a vertical axis;

a plurality of pistons connected to said crankshaft, each of said plurality of pistons being disposed for reciprocating movement within an associated one of a plurality of cylinders of said engine;

a first shaft supported for rotation about a first axis of rotation at a first rotational velocity in a first rotational direction, said first shaft having a first center of gravity which is radially displaced from said first axis of rotation by a first preselected amount; and a second shaft supported for rotation about a second axis of rotation at a second rotational velocity in a second rotational direction, said second shaft having a second center of gravity which is radially displaced from said second axis of rotation by a second preselected amount, said first and second axes of rotation being generally parallel to said vertical axis, said first and second rotational directions being opposite to each other, said first and second rotational velocities each being generally equal to a preselected multiple of the rotational velocity of said crankshaft, said first and second shafts being connected in torque transmitting association with said crankshaft, said first and second shafts being first and second rotors, respectively, of a supercharging device.

16. The engine of claim 15, further comprising:

a housing rigidly attached to said engine, said first and second shafts being supported by said housing for rotation within said housing.

17. The engine of claim 16, wherein:

said supercharging device is a Roots blower.

18. The engine of claim 17, wherein:

a first plane, bisecting each of said plurality of pistons and containing said vertical axis, extends between and is equidistant from said first and second axes of rotation.

19. The engine of claim 18, wherein:

said preselected multiple is two.

20. The engine of claim 19, wherein:

said plurality of pistons comprises four pistons connected to said crankshaft and said plurality of cylinders comprises four cylinders, said four cylinders being disposed in an in-line configuration.

21. The engine of claim 20, wherein:

said engine is a four cycle engine.

22. An engine of an outboard motor, comprising:

a crankshaft supported for rotation about a vertical axis;

a plurality of pistons connected to said crankshaft, each of said plurality of pistons being disposed for reciprocating movement within an associated one of a plurality of cylinders of said engine;

a first shaft supported for rotation about a first axis of rotation at a first rotational velocity in a first rotational direction, said first shaft having a first center of gravity which is radially displaced from said first axis of rotation by a first preselected amount;

a second shaft supported for rotation about a second axis of rotation at a second rotational velocity in a second rotational direction, said second shaft having a second center of gravity which is radially displaced from said second axis of rotation by a second preselected amount, said first and second axes of rotation being generally parallel to said vertical axis, said first and second rotational directions being opposite to each other, said first and second rotational velocities each being generally equal to a preselected multiple of the rotational velocity of said crankshaft, said first and second shafts being connected in torque transmitting association with said crankshaft, said first and second shafts being first and second rotors, respectively, of a supercharging device; and a housing rigidly attached to said engine, said first and second shafts being supported by said housing for rotation within said housing.

23. The engine of claim 22, wherein:

said supercharging device is a Roots blower.

24. The engine of claim 23, wherein:

a first plane, bisecting each of said plurality of pistons and containing said vertical axis, extends between and is equidistant from said first and second axes of rotation.

25. The engine of claim 24, wherein:

said preselected multiple is two, said plurality of pistons comprises four pistons connected to said crankshaft, said plurality of cylinders comprises four cylinders, said four cylinders is disposed in an in-line configuration, and said engine is a four cycle engine.

* * * * *